(12) United States Patent
Leung et al.

(10) Patent No.: US 10,873,544 B2
(45) Date of Patent: Dec. 22, 2020

(54) SWITCHING USING A POWER BAR PASS-THROUGH CARD

(71) Applicant: Facebook, Inc., Menlo Park, CA (US)

(72) Inventors: Che Kin Leung, Fremont, CA (US); Xu Wang, Fremont, CA (US); Hans-Juergen Schmidtke, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 224 days.

(21) Appl. No.: 15/705,205

(22) Filed: Sep. 14, 2017

(65) Prior Publication Data

US 2019/0081911 A1    Mar. 14, 2019

(51) Int. Cl.
*H04L 12/931* (2013.01)
*H04B 3/02* (2006.01)

(52) U.S. Cl.
CPC .............. *H04L 49/40* (2013.01); *H04B 3/02* (2013.01)

(58) Field of Classification Search
CPC .................................. H04L 49/40; H04B 3/02
USPC ......................................................... 370/254
See application file for complete search history.

(56) References Cited

U.S. PATENT DOCUMENTS

| | | |
|---|---|---|
| 5,629,836 A | 5/1997 | Wright et al. |
| 5,729,752 A | 3/1998 | Snider et al. |
| 5,997,326 A | 12/1999 | Koradia et al. |
| 6,373,713 B1 | 4/2002 | Jensen et al. |
| 6,381,146 B1 | 4/2002 | Sevier et al. |
| 6,422,876 B1 | 7/2002 | Fitzgerald et al. |
| 6,637,846 B2 | 10/2003 | Yang et al. |
| 6,814,582 B2 | 11/2004 | Vadasz et al. |
| 7,050,307 B2 | 5/2006 | Doblar et al. |
| 7,092,642 B2 | 8/2006 | Way et al. |
| 7,435,095 B1 | 10/2008 | Yi et al. |
| 8,009,420 B1 * | 8/2011 | Hill ........................... G06F 1/20 361/679.54 |
| 8,154,867 B2 | 4/2012 | Shearman et al. |

(Continued)

OTHER PUBLICATIONS

Non-Final Office Action dated Aug. 29, 2017 for U.S. Appl. No. 15/291,293 by Schmidtke, H., et al., filed Oct. 12, 2016.

(Continued)

*Primary Examiner* — Omar J Ghowrwal
*Assistant Examiner* — Kokou R Detse
(74) *Attorney, Agent, or Firm* — Van Pelt, Yi & James LLP

(57) ABSTRACT

Low-cost network switches and other computing systems are described herein. A low-cost network switch can operate at a lower ambient temperature (e.g., 55° C.) than conventional switches, thereby enabling the use of lower cost components (e.g., optical components that are not rated for operation at up to 70° C.). The network switch can utilize a power bar pass-through card that provides power from an enclosure bus bar to components of the network switch in lieu of a power supply unit. Additionally, ports of the network switch can operate in a 2×50G mode in which a network switch port capable of communicating at 100 Gbps interfaces with two external ports each capable of communicating at 50 Gbps. Communication in 2×50G mode can be supported by a four-channel Y-cable, in which the four channels are utilized by the network switch port and fan-out to two channels to each of the two external ports.

20 Claims, 5 Drawing Sheets

(56) References Cited

U.S. PATENT DOCUMENTS

| | | | |
|---|---|---|---|
| 8,795,001 B1* | 8/2014 | Lam | H01R 13/113 439/636 |
| 9,136,624 B1 | 9/2015 | Reynov et al. | |
| 9,686,886 B2 | 7/2017 | Okada et al. | |
| 10,165,703 B1* | 12/2018 | Adrian | H05K 7/1491 |
| 2003/0080568 A1 | 5/2003 | Busby et al. | |
| 2004/0002237 A1 | 1/2004 | Doblar et al. | |
| 2004/0047128 A1 | 3/2004 | McClelland, II et al. | |
| 2005/0207134 A1 | 9/2005 | Belady et al. | |
| 2006/0049727 A1 | 3/2006 | Corsini et al. | |
| 2006/0121421 A1 | 6/2006 | Spitaels et al. | |
| 2007/0184676 A1 | 8/2007 | Minich et al. | |
| 2011/0013348 A1 | 1/2011 | Seibold et al. | |
| 2012/0120596 A1 | 5/2012 | Bechtolsheim et al. | |
| 2013/0337665 A1 | 12/2013 | Cohen et al. | |
| 2014/0098492 A1 | 4/2014 | Lam et al. | |
| 2014/0206273 A1 | 7/2014 | Larsen et al. | |
| 2014/0307400 A1 | 10/2014 | French et al. | |
| 2014/0362874 A1 | 12/2014 | Nishimoto | |
| 2015/0086211 A1* | 3/2015 | Coffey | H04B 10/40 398/116 |
| 2015/0186319 A1* | 7/2015 | Blevins | G06F 13/4068 710/301 |
| 2015/0229438 A1 | 8/2015 | Le Taillandier De Gabory et al. | |
| 2015/0265857 A1* | 9/2015 | Barnes | A61N 7/02 600/411 |
| 2015/0323742 A1* | 11/2015 | Baker | G02B 6/28 385/24 |
| 2015/0363343 A1* | 12/2015 | Adhikesavalu | G01R 31/00 710/104 |
| 2015/0378415 A1* | 12/2015 | George | G06F 1/30 307/64 |
| 2016/0077556 A1 | 3/2016 | Yang et al. | |
| 2016/0128230 A1 | 5/2016 | Dogruoz M et al. | |
| 2016/0197679 A1 | 7/2016 | Tanaka et al. | |
| 2017/0237575 A1* | 8/2017 | Heath | H02J 3/12 307/1 |
| 2017/0245030 A1 | 8/2017 | Lyubomirsky | |
| 2017/0329371 A1 | 11/2017 | Schmidtke et al. | |
| 2017/0331766 A1 | 11/2017 | Schmidtke et al. | |
| 2017/0332506 A1 | 11/2017 | Schmidtke et al. | |
| 2017/0332518 A1 | 11/2017 | Schmidtke et al. | |
| 2017/0332519 A1 | 11/2017 | Schmidtke et al. | |
| 2018/0210524 A1* | 7/2018 | Koenen | H04L 12/10 |
| 2019/0058311 A1* | 2/2019 | Elliott | H05K 1/0203 |

OTHER PUBLICATIONS

Non-Final Office Action dated Jun. 15, 2017 for U.S. Appl. No. 15/338,255 by Lyubomirsky, I., et al., filed Oct. 28, 2016.

Notice of Allowance dated Jul. 3, 2017 of U.S. Appl. No. 15/291,313 of Schmidtke H., et al., filed Oct. 12, 2016.

U.S. Appl. No. 15/291,263 by Schmidtke, H. et al., filed Oct. 12, 2016.

U.S. Appl. No. 15/291,293 by Schmidtke, H. et al., filed Oct. 12, 2016.

U.S. Appl. No. 15/291,313 by Schmidtke, H. et al., filed Oct. 12, 2016.

U.S. Appl. No. 15/291,324 by Schmidtke, H. et al., filed Oct. 12, 2016.

U.S. Appl. No. 15/291,348 by Schmidtke, H. et al., filed Oct. 12, 2016.

U.S. Appl. No. 15/338,255 by Lyubomirsky, I., et al., filed Oct. 28, 2016.

U.S. Appl. No. 15/655,795 by Schmidtke, H., et al., filed Jul. 20, 2017.

U.S. Appl. No. 15/706,561 by Schmidtke, H. et al. filed Sep. 15, 2017.

U.S. Appl. No. 15/725,239 by Taylor, J., et al., filed Oct. 4, 2017.

U.S. Appl. No. 15/716,454 by Schmidtke, K., filed Sep. 26, 2017.

Corrected Notice of Allowability dated Nov. 21, 2017 for U.S. Appl. No. 15/291,313 by Schmidtke, H., et al., filed Oct. 12, 2016.

European Perforators Association "The Advantages of Perporated Metals" Aug. 21, 2016, EUROPERF.

Non-Final Office Action dated Nov. 17, 2017 for U.S. Appl. No. 15/291,348 by Schmidtke, H., et al., filed Oct. 12, 2016.

Non-Final Office Action dated Nov. 24, 2017 for U.S. Appl. No. 15/291,263 by Schmidtke, H., et al., filed Oct. 12, 2016.

Notice of Allowance dated Dec. 6, 2017 for U.S. Appl. No. 15/291,293 by Schmidtke, H., et al., filed Oct. 12, 2016.

* cited by examiner

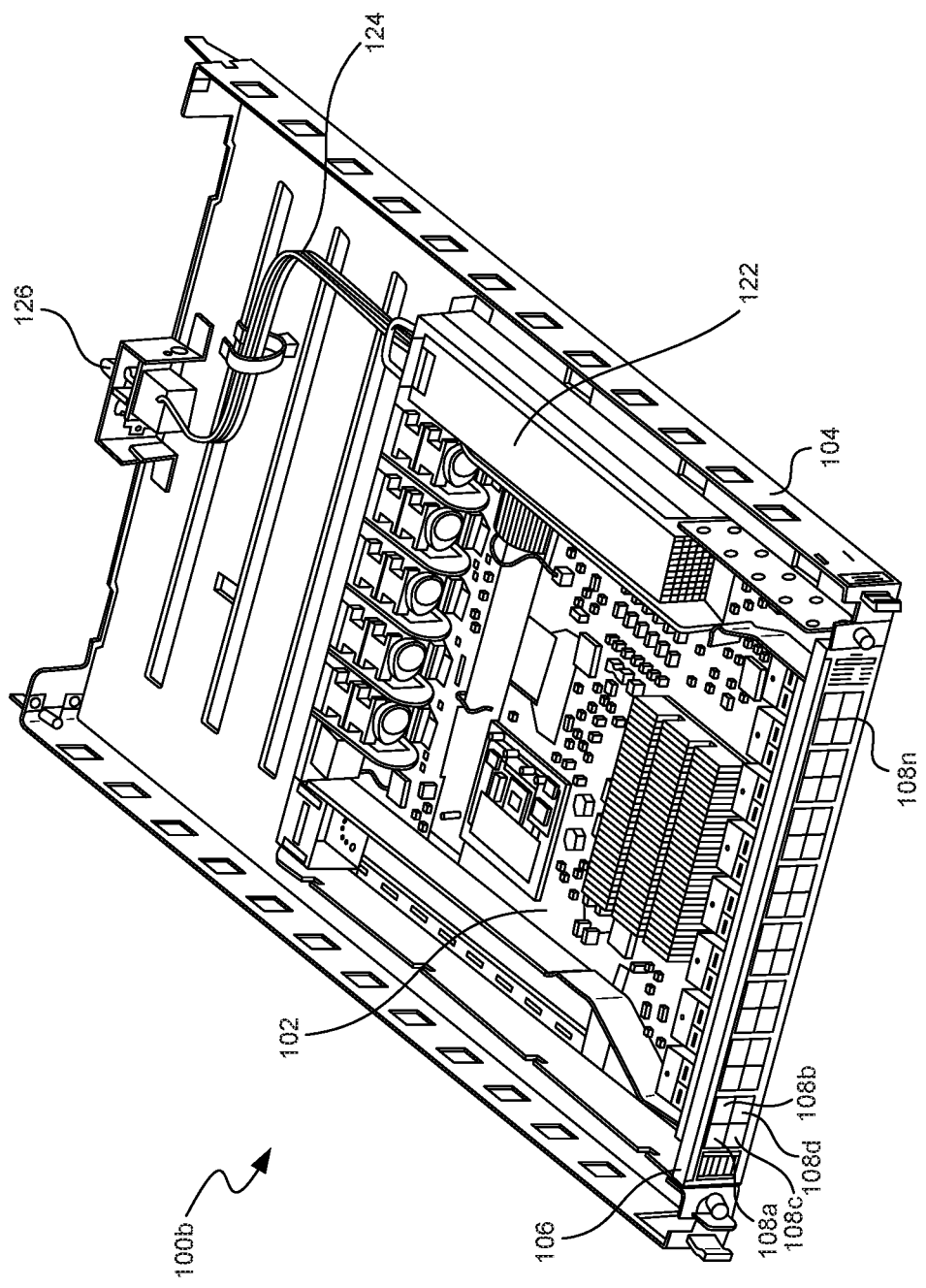

SWITCHING USING A POWER BAR PASS-THROUGH CARD

BACKGROUND

Some entities, such as large corporations, government agencies, or universities, maintain data centers to house their computing systems and associated components. The computing systems may be used to, for example, provide online services to users within and without the entity, host online storage solutions, and process large quantities of data. The computing systems, or servers, are typically deployed as modules that are coupled to a standardized frame or enclosure that houses many such server modules. Depending on the particular workloads for which a server module is used, the server module may need to communicate with other server modules within the enclosure, with server modules located within other enclosures within the data center, or with an outside network. That is, a data center typically features a computer network that provides data communication between the servers of the data center, while also supporting data communication with computer networks outside the data center.

Data centers typically contain various network components to enable data transport between the data center servers and the data center network. For example, the data center may utilize network switches (also known as a switching hubs, bridging hubs, MAC bridges or simply "switches"), which are computer networking devices that connect other devices together in a computer network. Network switches are typically used in complex data networking environments, such as data centers to, for example, interconnect various devices within one or more subnetworks. Some network switches use packet switching to receive, process, and forward data to destination devices. Switches can be used for electrical switching, optical switching that enables signals in optical fibers or integrated optical circuits to be selectively switched from one circuit to another (e.g., between severs), or a combination of electrical and optical switching.

Network switches found in data centers, as well as in other complex data networking environments, typically utilize fiber optic cabling and components to meet significant communication demands (e.g., the high throughput needed to satisfy workloads). Conventionally, the fiber optic components used in network switches are rated to operate in temperatures as high as 70° C. due to the thermal design of a traditional network switch. These optical components, however, are significantly more expensive than comparable optical components that perform the same function but reliably operate up to a lower maximum temperature. It would therefore be advantageous to develop a network switch with reduced thermal demands, thereby enabling the use of lower-cost optical components, while maintaining the data transport capabilities of the network switch.

BRIEF DESCRIPTION OF THE DRAWINGS

FIGS. 1A and 1B are isometric views of a network switch configured in accordance with embodiments of the present technology.

DETAILED DESCRIPTION

Figure 1A:
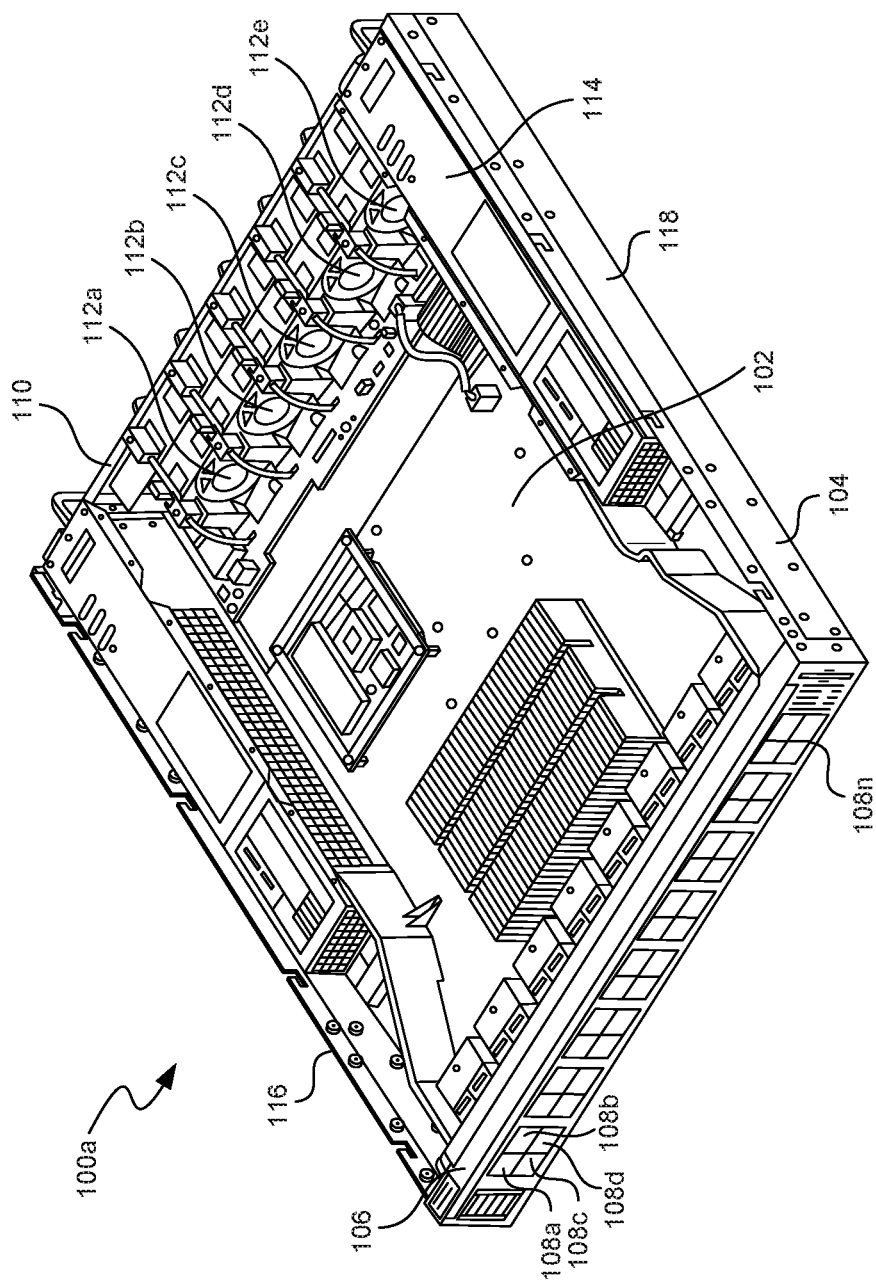

The following disclosure describes various embodiments of low-cost network switches for use in, for example, highly-functioning data computing environments, such as server data computing environments, data centers, etc. In some embodiments, a low-cost network switch configured in accordance with the present technology operates within a cabinet or other enclosure, such as a rack or blade enclosure, that houses multiple computing components. In these embodiments, the enclosure provides services, such as power, cooling, networking, various interconnects, and other management facilities, to the computing components housed therein (e.g., the low-cost network switch, rack mount servers, blade servers, etc.). For example, direct current (DC) power can be distributed to the computing components via a bus bar housed within the enclosure. In these embodiments, the low-cost network switch utilizes a power bar pass-through card, instead of an alternating current (AC) power supply unit (PSU), to provide DC power to the various network switch components. This can result in lower component operating temperatures, and lower overall component costs, than those of conventional network switches that utilize AC PSUs. In further embodiments, network switches configured in accordance with the present technology utilize ports for communicating data with other processing devices or computing systems (e.g., servers, network interface controllers, etc.) over a connected cable (e.g., a fiber optic cable or active or passive electrical copper connection). In those embodiments the switch can be configured to operate each of the ports in different modes based on the number of computing devices connected to the ports and the communication capabilities of the connected computing devices. For example, in some embodiments of the network switch in which each port is capable of data transmission at the rate of 100 gigabits per second (Gbps), ports can operate in a 1×100 G mode (connected to one device at 100 Gbps), a 2×50 G mode (connected to two devices at 50 Gbps each), a 4×25 G mode (connected to four devices at 25 Gbps each), a 1×40 G mode (connected to one device at 40 Gbps), or a 4×10 G mode (connected to four devices at 10 Gbps each). In these embodiments, the network switch utilizes specialized cables to support different operating modes, such as a specialized Y-cable used for the 2×50 G mode. The foregoing are only some of the aspects of the various embodiments of network switches and other computing systems described herein, and further details describing these aspects are provided below.

Certain details are set forth in the following description and in FIGS. 1A-4 to provide a thorough understanding of various embodiments of the present technology. In other instances, well-known structures, materials, operations and/or systems often associated with network switches, circuit boards, electrical connectors, computer hardware, and associated systems and methods are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIGS. 1A and 1B are isometric views of a computer system 100a and 100b, respectively, configured in accordance with embodiments of the present technology. In the illustrated embodiments, the computer systems 100a and 100b are low-cost network switches, and are referred to individually herein as a "network switch 100" or simply "switch 100" for ease of reference. In other embodiments, however, the computer systems 100a,b and various embodiments of the technology described herein can be implemented in other types of computer systems, including other types of switch systems, server systems, etc. Referring first to FIG. 1A, the network switch 100a includes a main board 102 mounted to a chassis 104. The chassis 104 has a front end 106 opposite an aft end 110. In the illustrated embodiments, a plurality of data ports 108 are mounted to the front end 106. More specifically, in the illustrated embodiment, the network switch 100a has 32 data ports (identified individually as data ports 108a, 108b, 108c, 108d, though 108n), though other number of data ports may be used. Additionally, a plurality of fans 112 (identified individually as fans 112a, 112b, 112c, 112d, and 112e) are mounted to aft end 110. The chassis 104 can be constructed from, for example, sheet metal panels attached to a metal framework using methods and systems well known in the art. Aspects of the chassis 104 may be standardized to enable installation and operation of the switch 100a within a standards-conforming enclosure (not shown). For example, the enclosure may have a specified width and depth, which in turn dictates the corresponding outer dimensions of the chassis 104. As a further example, the enclosure may define a height (known as a rack unit height, or "RU") that establishes the allowed heights of the chassis 104. For example, the chassis 104 may be 1RU, 1.5RU, 2RU, 4RU, etc. in height.

In the illustrated embodiment, the network switch 100a includes a power supply unit (PSU) that provides power to components of the switch (e.g., the main board 102, the fans 112, etc.). The PSU receives an input AC or DC voltage (from, e.g., facility power), and outputs DC voltages as required by components of the switch 100a (e.g., a 12V output, a 3.3V output, etc.). In the embodiments illustrated in FIG. 1A, the chassis 104 can be mounted directly to the housing enclosure. That is, a left edge 116 and a right edge 118 of the chassis 104 can directly attach to enclosure racks. In some embodiments, the chassis 104 is sized for housing within a 19-inch wide rack enclosure.

Turning next to FIG. 1B, in the illustrated embodiment, the network switch 100b is substantially similar to the network switch 100a described above. In the embodiment of FIG. 1B, however, the switch 100b is adapted to operate in configurations in which the chassis 104 does not mount directly to the enclosure. For example, where the width or depth of the enclosure is greater than the corresponding width or depth of the chassis 104, the chassis is mounted to an adaptor frame or box 120. The adaptor box 120 has inner dimensions that enable the chassis 104 to be mounted to the adaptor box 120, and outer dimensions for attaching the adaptor box 120 to the enclosure. In some embodiments the adaptor box 120 is sized to fit within a 21-inch wide rack enclosure, and further sized to receive and support a 19-inch wide chassis 104. Additionally, in lieu of or in addition to a PSU, the network switch 100b includes a power bar pass-through card 122 that delivers power from an enclosure bus bar (not shown) to components of the switch. For example, the bus bar may maintain a voltage of 12V DC, 12.5V DC, or other, and may be coupled to the power bar pass-through card 122 by a power cable 124 that connects to the bus bar via a bus bar clip 126. In some embodiments the power bar pass-through card 122 has the same form factor as a PSU, and can therefore be plugged into a PSU slot without modification of a main board 102. The power cable 124 and bus bar clip 126 can be used to reduce electromagnetic interference (EMI). The operation of the power bar pass-through card 122, power cable 124, and bus bar clip 126 is described in greater detail below.

Although FIG. 1B illustrates a configuration in which the network switch 100b has an adaptor box 120 and utilizes a power bar pass-through card 122, and FIG. 1A illustrates a configuration in which the network switch 100a chassis 104 is directly connected to the enclosure and utilizes a PSU 114, other configurations may be used. That is, a PSU 114 can be used in conjunction with an adaptor box 120, and a power bar pass-through card 122 can be used without an adaptor box.

Figure 2:
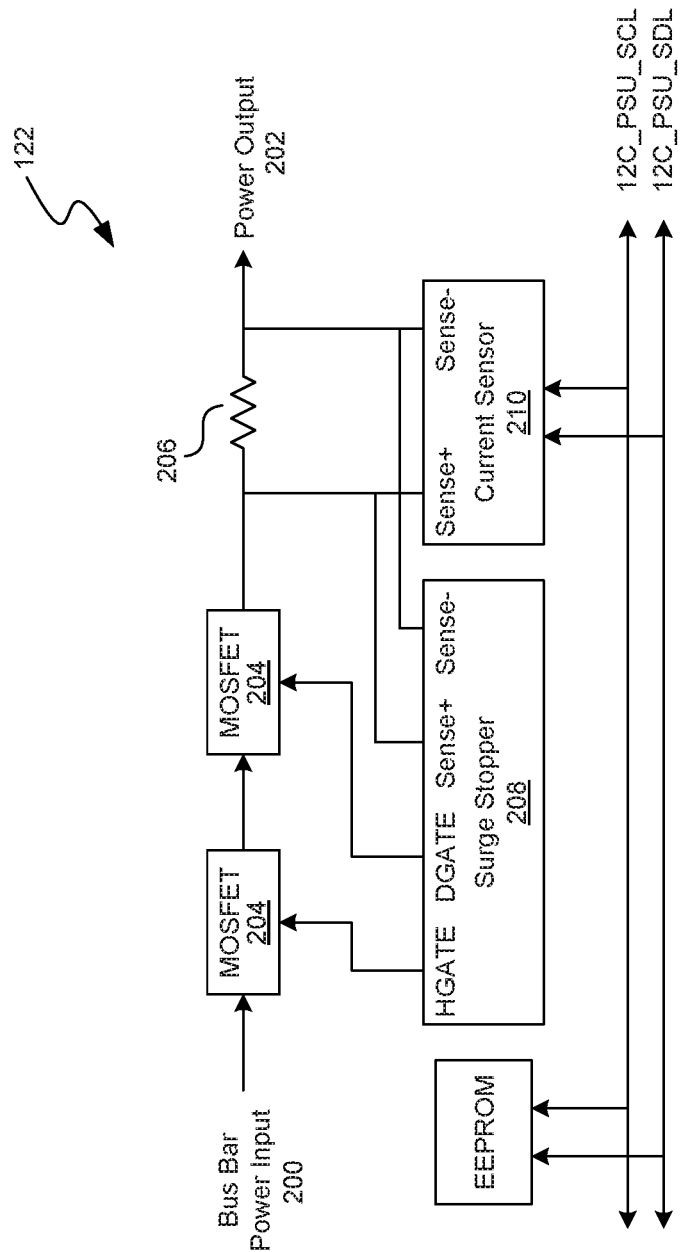
FIG. 2 is a block diagram of a power bar pass-through card used in embodiments of the present technology.

FIG. 2 is a block diagram of the power bar pass-through card 122 configured in accordance with embodiments of the present technology. In some embodiments of the network switch 100, the power bar pass-through card 122 is needed to provide power to the switch from an enclosure bus bar that provides power. The power bar pass-through card 122 occupies the same form factor as a traditional PSU, and therefore can be used in a network switch 100 without requiring modifications of the main board 102 (illustrated in FIGS. 1A and 1B). The power bar pass-through card 122 receives power input 200 and generates power output 202. The power input 200 may be, for example, a 12V DC input of up to 60 Å, and may be received over a power cable 124 that is connected to a bus bar via a bus bar clip 126. The addition of a metal shield to the power cable 124 and bus bar clip 126 may reduce the amount of electromagnetic interference experienced by the network switch 100 as well as the amount of electromagnetic interference generated by the network switch 100. The power output 202 can be generated with a combination of active devices, such as transistors 204, and passive devices, such as a resistor 206, and a regulator, such as a surge stopper 208. In some embodiments, the surge stopper 208 protects loads from high voltage transients. That is, it limits and regulates the voltage output 202 during an overvoltage event by controlling the voltage drop across an external MOSFET device, such as one of transistors 204. In some embodiments, the surge stopper 208 allows for hot swapping of the power bar pass-through card 122. In some embodiments, the power bar pass-through card 122 also includes a current sensor 210, which enables the power bar pass-through card to monitor power usage. Power usage data may be retrieved by the network switch 100 from the current sensor 210 over, for example, a bus such as I2C.

Figure 3B:
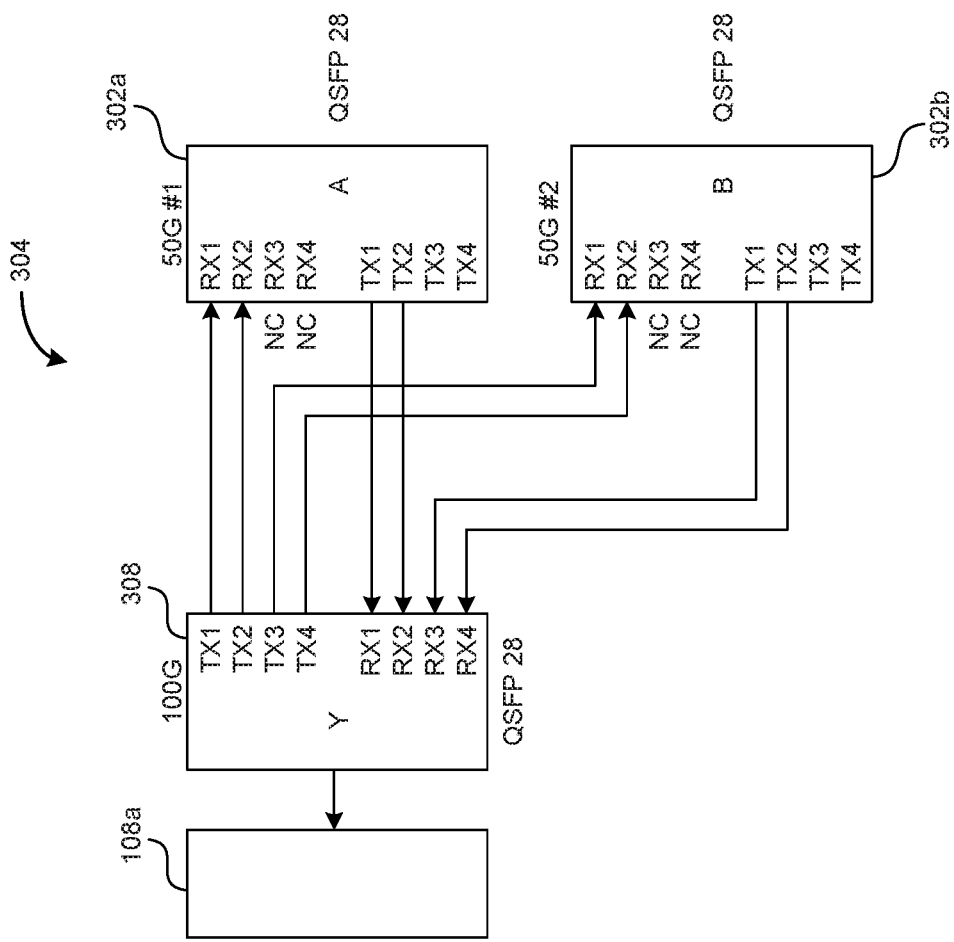
FIG. 3B is a schematic diagram of data communication connectivity of the cable configured in accordance with embodiments of the present technology.
Figure 3A:
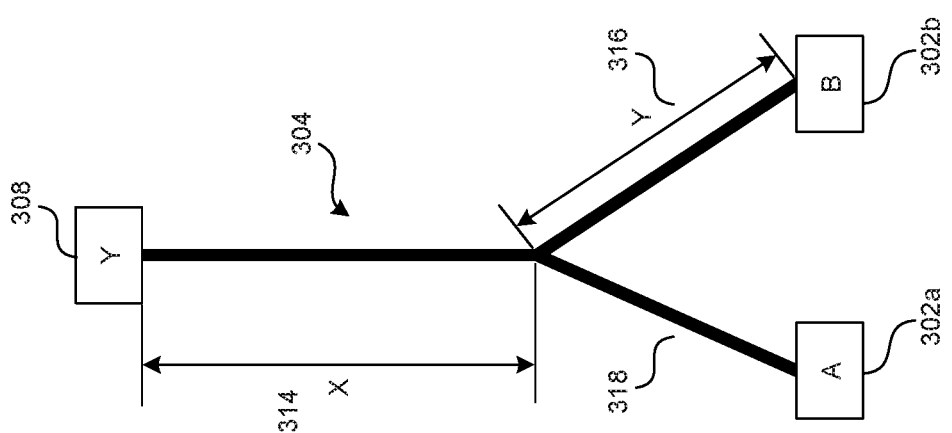
FIG. 3A is a schematic diagram of a cable configured in accordance with embodiments of the present technology.

FIG. 3A is a schematic diagram of a cable 304 configured in accordance with embodiments of the present technology. The cable 304 includes headers 308, 302a, and 302b (which can also be referred to as connectors or plugs), that allow the cable to connect to computing systems and processing devices, such as computer servers, network interface controllers, network switches, and other components. As described herein, the cable 304 may be used to transmit and receive data between the network switch 100 (i.e., either the network switch 100a or the network switch 100b) and two external devices. The headers 308, 302a, and 302b may adhere to a particular specification, such as the Quad Small Form-factor Pluggable (QSFP) specification, which provides a compact, hot-pluggable transceiver used for data communications. In some embodiments, one or more of headers 308, 302a, and 302b are compliant with QSFP28, which provides four channels that are capable of carrying 28 Gbps each for a total capacity of over 100 Gbps. In those embodiments, one or more of the headers 308, 302, and 302b may be SFP+ plugs or other plugs capable of interfacing with a Small Form-factor Pluggable Plus (SFP+)-compliant port. The cable 304 may be a fiber optic cable, or an active or passive electrical copper connection. In some embodiments, the cable 304 is a twinaxial cables, such as a direct attach copper (DAC) cable with integrated SFP+ plugs. In some embodiments, each channel of cable 304 carries 25 Gbps each.

To support 100 Gbps communication (such as for the interfacing with a 100 Gbps port of network switch 100), header 308 and cable region 314 of the cable 304 may use four channels (each of which are capable of communicating at least 25 Gbps). To support 50 Gbps communication (such as for interfacing with external devices capable of less than 100 Gbps communication), headers 302a and 302b, and cable regions 316 and 318, may use two channels (each of which are capable of communicating at least 25 Gbps). In other words, the four channels that are communicatively coupled to the header 308 (and used, for example, to interface with the network switch 100) fan-out in a 'Y' to two channels to each of headers 302a and 302b. It has been observed that under the multi-source agreement (MSA) provided by the Small Form Factor Committee, which specifies the form factor and electrical interface of the QSFP ports and associated cables, no such cable or topology has been defined. That is, the MSA does not provide for a 2×50 G mode in which a 100 Gbps device communicates with two devices at 50 Gbps each. As described below, the illustrated embodiment may be advantageously used, however, when the network switch 100 interfaces with computing components capable of at most 50 Gbps communications.

FIG. 3B is a schematic diagram of data communication connectivity of the cable 304 configured in accordance with embodiments of the present technology. As described herein, the network switch 100 has one or more ports 108 that each interface with cables, such as cable 304, to transport data to and from external devices. As illustrated in FIG. 3B, port 108a of the network switch 100 connects to cable 304 to communicate with two external devices (not shown). Header 308 of the cable 304 is connected to port 108a of the network switch, and headers 302a and 302b are connected to external ports of the external devices. As illustrated, header 308 is capable of 100 Gbps communication, while headers 302a and 302b are each capable of 50 Gbps communication. That is, in the embodiment shown port, 108a of the network switch 100 communicates at 100 Gbps with two external devices each at 50 Gbps, and therefore utilizes the cable 304 to operate in 2×50 G mode. To enable 2×50 G operation, the cable 304 interfaces with the port 108a of the network switch 100 through header 308 over four data channels, and communicates with each of the external devices through headers 302a and 302b over data channels. The channels of the cable 304 are numbered 1 through 4, and each channel has a transmit and receive component. That is, channel 1 is comprised of TX1 and RX1, channel 2 is comprised of TX2 and RX2, etc. In the embodiment illustrated in FIG. 3B, header 302a of cable 304 uses channels 1-2 (from the header 308), and header 302b of the cable uses channels 3-4 (from the header 308). Though FIG. 3B illustrates multiple connections between header 308 and headers 302a and 302b, those connections may be part of the same physical cable 304 capable of multi-channel communication.

As a result of the technologies described herein, the network switch 100 can operate at substantially lower temperatures than conventional network switches. For example, in some embodiments, the network switch 100 can operate at temperatures of about 55° C., rather than temperatures of about 70° C. as typically found in conventional network switches and other similar computer systems. Advantageously, operation of the network switch 100 at a lower temperature (e.g., 55° C.) enables the use of less expensive components (e.g., optical components that are not rated for operation at up to 70° C.). Although specific circuitry may be described above, those of ordinary skill in the art will recognize that aspects of the present technology are not limited to the particular arrangements illustrated herein, but can be implemented in various other modular arrangements of switch circuitry.

Figure 4:
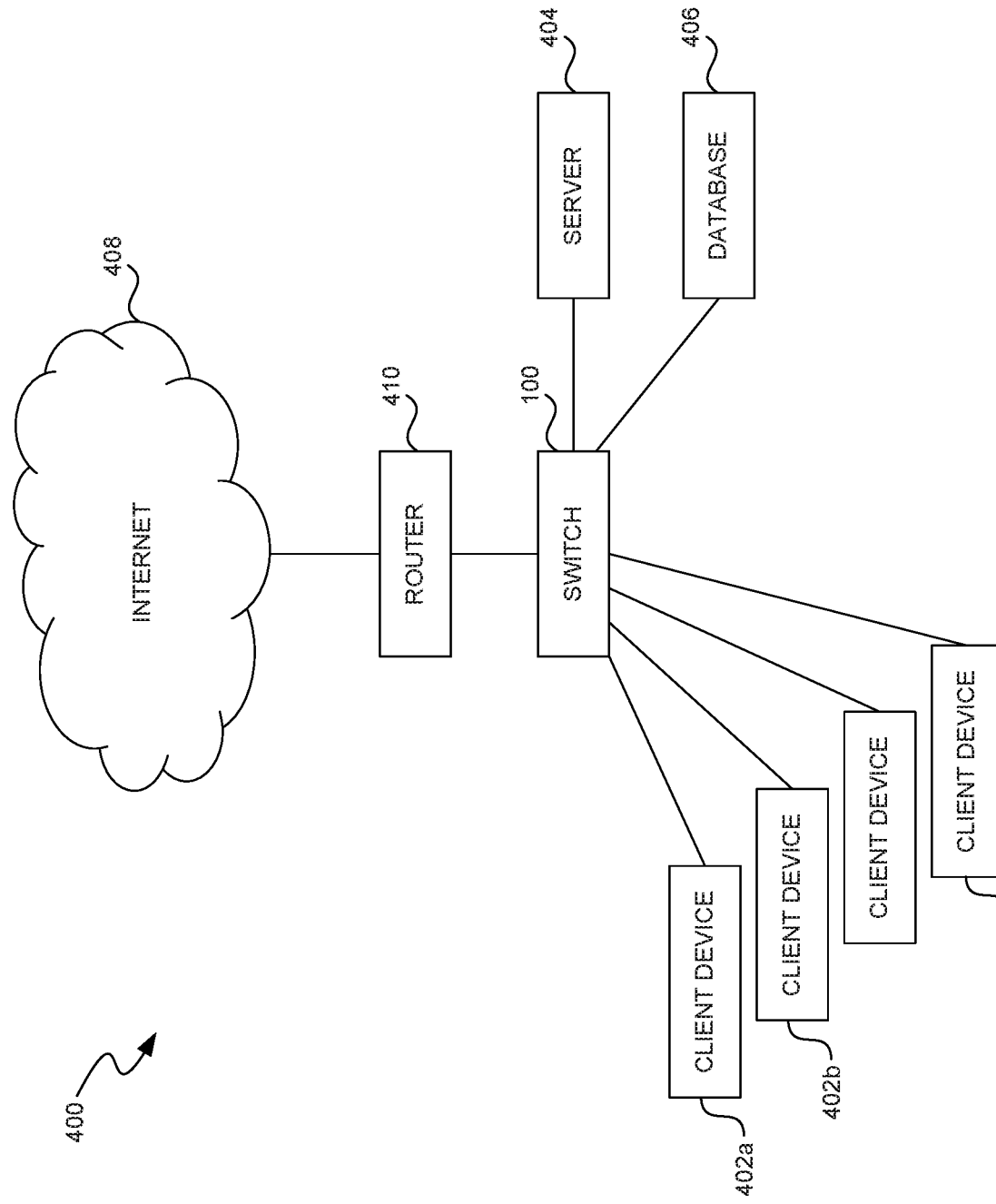
FIG. 4 is a schematic diagram illustrating one possible environment in which embodiments of the present technology can be implemented.

FIG. 4 in the following discussion provide a brief, general description of a suitable computing environment 400 in which the network switch 100 can be implemented. In the illustrated embodiment, the switch 100 can be implemented in a networked environment using logical connections to one or more remote computers, such as a plurality of client devices 402 (identified individually as client devices 402a-i). The client devices 402 can include, for example, personal computers or work stations, etc. having one or more associated processors coupled to one or more user input devices, data storage devices, etc. The switch 100 can also be operably connected to one or more servers 404 and/or an associated databases 406. In operation, the switch 100 can receive data from one or more of the client devices 402 and efficiently route or transmit the data to one or more different devices in the environment 400, or to an additional remote device via a router 410 and the Internet 408. Aspects of the disclosed technology, however, are not limited to any particular environment, and may be practiced in a variety of other computing environments.

Those skilled in the relevant art will appreciate that aspects of the technology disclosed herein can be practiced with other communications, data processing, or computer system configurations, including: Internet appliances, handheld devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system, comprising:
   a first processing device housed at least in part within an enclosure;
   a second processing device housed at least in part within the enclosure;

a network switch housed at least in part within the enclosure, wherein the network switch includes a power bar pass-through card that receives an input direct current (DC) voltage from a bus bar of the enclosure and provides an output direct current (DC) voltage to a component of the network switch external to the power bar pass-through card and the power bar pass-through card conforms to a power supply unit form factor by enabling power to be supplied to other network switch components and is connected to a board of the network switch via a slot for a power component that provides power; and a data cable connecting only the first processing device and the second processing device to the network switch, wherein:

the data cable comprises a plurality of data channels for communicating data between the first processing device, the second processing device, and the network switch;

the data cable further comprises a first header for interfacing with the first processing device, a second header for interfacing with the second processing device, and a third header for interfacing with the network switch;

the first header utilizes only a first portion of the plurality of data channels of the data cable by utilizing a first set of two data channels among the plurality of data channels of the data cable in the same combined single first header to interface with the same first processing device;

the second header utilizes only a second portion of the plurality of data channels of the data cable different from the first portion by utilizing a second set of two data channels among the plurality of data channels of the data cable in the same combined single second header to interface with the same second processing device;

the third header utilizes the first set of two data channels and the second set of two data channels to interface with the network switch; and each of the first header, the second header, and the third header conform to a Quad Small Form-factor Pluggable (QSFP) form factor and electrical interface standard.

2. The system of claim 1 wherein at least one of the first header, the second header, or the third header conform to the QSFP28 standard.

3. The system of claim 1 wherein the data cables interfaces with each of the first processing device and the second processing device at up to 50 gigabits per second, and further interfaces with the network switch at up to 100 gigabits per second.

4. The system of claim 1 wherein the data cable uses twinaxial cabling.

5. The system of claim 1 wherein the data cable is a direct attach copper cable.

6. The system of claim 1 wherein at least one of the first processing device or the second processing device has four data channels and the cable interfaces with two of the four data channels.

7. The system of claim 1 wherein at least one of the first processing device or the second processing device is a network interface controller.

8. The system of claim 1 wherein the network switch includes a power bar pass-through card.

9. The system of claim 1, wherein the enclosure is a 19-inch wide form factor rack enclosure.

10. The system of claim 1, wherein the input DC voltage from the enclosure bus bar is at 12 volts.

11. The system of claim 1, wherein the power bar pass-through card receives the input DC voltage from the bus bar of the enclosure through a power cable, and the power cable coupled to the bus bar with a bus bar clip.

12. The system of claim 11, wherein the power cable and bus bar clip reduce electromagnetic interference of the network switch.

13. The system of claim 1, wherein the power bar pass-through card includes a surge stopper that protects the network switch from high voltage transients.

14. The system of claim 1, wherein the power bar pass-through card includes a current sensor.

15. The system of claim 14, further comprising an I2C bus, wherein the I2C bus transmits power usage data from the current sensor to a main board.

16. A system, comprising:

a first processing device housed at least in part within an enclosure;

a second processing device housed at least in part within the enclosure;

a network switch housed at least in part within the enclosure, wherein the network switch includes a power bar pass-through card that receives an input direct current (DC) voltage from a bus bar of the enclosure and provides an output direct current (DC) voltage to a component of the network switch external to the power bar pass-through card and the power bar pass-through card conforms to a power supply unit form factor by enabling power to be supplied to other network switch components and is connected to a board of the network switch via a slot for a power component that provides power; and a data cable connecting only the first processing device and the second processing device to the network switch, wherein:

the data cable comprises a plurality of data channels for communicating data between the first processing device, the second processing device, and the network switch;

the data cable further comprises a first header for interfacing with the first processing device, a second header for interfacing with the second processing device, and a third header for interfacing with the network switch;

the first header utilizes only a first portion of the plurality of data channels of the data cable by utilizing a first set of two data channels among the plurality of data channels of the data cable in the same combined single first header to interface with the same first processing device;

the second header utilizes only a second portion of the plurality of data channels of the data cable different from the first portion by utilizing a second set of two data channels among the plurality of data channels of the data cable in the same combined single second header to interface with the same second processing device; and the third header utilizes the first set of two data channels and the second set of two data channels to interface with the network switch;

wherein the first header is capable of communicating at 100 gigabits per second, and the second header and third header are each capable of communicating at 50 gigabits per second.

17. The system of claim 16, wherein at least one of the first header, the second header, or the third header is an SFP+-compliant plug.

18. The system of claim 16, wherein the power bar pass-through card receives the input DC voltage from the bus bar of the enclosure through a power cable, and the power cable coupled to the bus bar with a bus bar clip.

19. The system of claim 16, wherein the power bar pass-through card includes a surge stopper that protects the network switch from high voltage transients.

20. The system of claim 16, wherein the power bar pass-through card includes a current sensor.

* * * * *